ial No. 474,617

2,931,738
BONDED FIBROUS INSULATION AND METHOD FOR MANUFACTURING SAME

Joseph P. Stalego, Newark, Ohio, assignor to Owens-Corning Fiberglas Corporation, a corporation of Delaware No Drawing. Application December 10, 1954
Serial No. 474,617

19 Claims. (Cl. 117—126)

This invention relates to a high temperature insulation product formed of glass fibers and a binder capable of exposure to sparks, direct flame and high temperatures without punking and without excessive deterioration thereby to enable better utilization of the heat stable characteristics of the high strength glass fibers in the manufacture of insulation products which can be used under conditions where other low cost insulating materials and other bonded or molded glass fiber insulation products of the type heretofore produced are incapable of being used.

It is an object of this invention to produce a bonded or molded glass fiber insulation product capable of exposure to sparks, direct flame, or high temperatures without punking of the binder or deteroration of the insulation product.

Another object is to produce a thermally stable insulation product of the type described which can be manufactured efficiently and economically on existing equipment with relatively low cost materials and which embodies the more desirable physical characteristics of insulations of the type heretofore produced from the standpoint of strength, flexibility, shape, porosity and insulating characteristics and it is a related object to provide a binder for use with glass fibers in the manufacture of insulation products which is capable of withstanding conditions which caused punking or deterioration of binders heretofore generally employed in the manufacture of similar insulations.

More specifically, it is an object of this invention to provide a binder composition for use in the manufacture of bonded or molded insulation products of glass wool fibers in which the binder is stable under the conditions of storage and use and thereby enjoys good shelf life and ease of application with conventional equipment; which cures sufficiently rapidly to enable insulation products to be manufactured in a practical and economical manner on existing equipment; which has good moisture resistance when applied as a binder on the glass fiber surfaces; which is relatively free of noxious odors and fumes; which is capable of use as a binder with glass fibers under conditions which would ordinarily cause punking or deterioration of organic resinous systems of the type heretofore employed in such constructions, and which is formulated of readily available, low cost material for use in the manufacture of high temperature insulation products embodying many of the desirable physical properties of an acceptable insulation, and it is a related object to produce a new and improved insulation product which makes use of same.

It is a still further object of this invention to produce and to provide a method of producing an insulation product of the type described which employs an additional treatment still further to improve the heat stability and flame resistance of the insulation product to the extent that the insulation is capable of withstanding temperatures up to the fusion temperature of the glass composition of which the fibers are formed so as to limit the temperature of use of the insulation product by the glass composition as distinguished from the low temperature limitations imposed by the decomposition temperatures of the resinous binders of the type heretofore employed.

Glass fibers are capable of use for insulation purposes throughout a very wide temperature range including temperatures far below 0° C. to temperatures as high as 1200° F. or more without harmfully affecting the strength properties of the glass fibers and without loss in flexibility or any of the other desirable characteristics of glass fibers. Utilization at high temperature is limited, however, by the other materials with which the glass fibers are combined in the manufacture of glass fiber insulations. As a result, it is desirable to formulate a binder composition with which fuller utilization can be made of the wide temperature ranges available from the use of glass fibers for insulation purposes. The development of a binder composition capable of withstanding high temperatures without punking or deterioration has been the subject of intensive research for many years.

To the present, in the manufacture of molded or bonded glass fiber insulation products, use has been made principally of phenol formaldehyde resinous materials as the binder component, alone or in combination with an incompatible oil or lubricant. To a lesser extent, use has also been made of other thermosetting resinous materials as the binder component such as urea formaldehyde, melamine formaldehyde, unsaturated polyester resins and the like. These materials have been adopted because of their low cost, their ease of application and the short time cycle required for cure in the manufacture of bonded or molded insulations such as pipe insulation and the like. These materials have also been adopted because of the small amount of resinous binder generally required for use in the development of the desired bonding relation and because of the many other desirable characteristics of the insulation products that are formed with such organic resinous binders.

In general, organic resinous binders of the type heretofore employed with glass wool fibers in the manufacture of insulations being to break down thermally at temperatures as low as 350° F. Deterioration is accelerated as the temperature is increased and substantially complete and immediate elimination of the resinous binder occurs upon exposure to temperatures in the range of about 800° F. or more. Attempts have been made to substitute inorganic materials which would not be affected by heat, such as sodium silicate or cementitious materials of the type gypsum cement, magnesium oxysulphate cement, Portland cement and the like. Insulation products which have been fabricated with such inorganic silicates or cementitious materials have been unacceptable in many of the applications because of deficiencies in a number of the properties demanded for a good thermal insulation, such as low density, flexibility, good hand and feel and simplicity in manufacture and such insulation products have been found to be more competitive with the others in cost.

The improvement forming the subject matter of this invention resides in the manufacture of a glass fiber insulation fabricated with a binder composition formulated of a combination of materials including an alkyd resin and a urea-borate condensation reaction product. These materials in combination are capable of being used alone or in combination with an incompatible oil or lubricant present in small amounts to lubricate the fiber surfaces and to cause the binder components to migrate toward the fiber intersections where more complete and efficient utilization can be made of the binder for securing the fibers one to another without causing excessive stiffening of the fibers thereby to achieve the desired bonding relation with minimum amounts of binder and with less interference with the desirable characteristics of the formed insulation product.

During the extensive investigations which have been conducted in search for a binder capable of use with glass fibers in the manufacture of such high temperature insulation products, it has been found that the alkyd type resinous materials tended to provide for greater heat stability than is available from phenol formaldehyde or urea formaldehyde binders previously employed. Although the temperature stability is improved, such alkyd resins alone are impractical to use as a binder for glass fiber insulations at the temperature levels desired. While improvement in thermal stabiltiy may be secured by the use of alkyd resins, such materials have been found to be inferior to the resinous materials previously employed in other important respects. For example, the alkyd resins have been found to require a long time cycle for cure with the result that it becomes impractical to make use of the alkyd resins alone in the manufacture of such insulation products.

It has been found, however, that when the alkyd resins are formulated into a binder composition in combination with a urea-borate condensation reaction product, the latter appears to accelerate the curing rate of the composite binder to the extent that it becomes economical and practical to use such a binder composition in the manufacture of bonded or molded glass fiber insulations. When the urea-borate condensation reaction product is present in amounts which will hereinafter be described in combination with the alkyd resin, the curing time is reduced by as much as one-third of the time required for the alkyd resin alone. In addition to the marked reduction in the curing cycle of the binder, the combination with urea-borate produces a binder composition having improved stability, especially when formulated with an aqueous medium as a diluent. This enables formulation of the binder composition in large quantities in advance without fear of separation or change. In addition, the stability of the binder composition that is formed permits use thereof with conventional equipment for application onto the glass fiber surfaces and for cure in the manufacture of an improved bonded and molded insulation product.

The synergistic reaction between the urea-borate and the alkyd resin in the binder composition is further evidenced by the change in the characteristics of the urea-borate since the latter is improved from the standpoint of its moisture resistance and the two materials together produce a binder which is capable of withstanding temperatures higher than either component alone without punking or deterioration.

While most heat curable alkyd resinous materials formed by condensation reaction of a polyhydric alcohol and a polybasic acid are capable of use in combination with the urea-borate in the manufacture of a binder composition forming the subject matter of this invention, it is preferred to make use of an alkyd resin of the type described in the Kneisley Patent No. 2,646,410 and which may be further represented as the condensation reaction of a polyhydric alcohol, such as pentaerythritol and an unsaturated dicarboxylic acid such as maleic anhydride or maleic or fumaric acid and a polyglycol, such as ethylene glycol, the latter of which may be employed in amounts up to 15 percent by weight of the binder forming materials. A suitable alkyd resin of the type which may be employed in the practice of this invention is presently marketed by the Hercules Powder Company of Wilmington, Delaware, under the trade-name "A-49-85W" resin.

As the urea-borate, it is preferred to make use of the condensation reaction product of urea, boric acid, formaldehyde, and ethylene glycol, such as may be represented by the type of material marketed by Booty Resineers under the "Tybon" trade name, as illustrated by Tybon 5411. The following is representative of a formulation for use in the manufacture of a urea-borate which can be combined with an alkyd resin for use in the practice of this invention:

*Example 1*

In the manufacture of a 200 pound mixture for cooking the resin, 5 pounds of boric acid and 10 pounds of ethylene glycol are combined with the remainder which is formed of urea and formaldehyde present in the ratio of 5 parts by weight formaldehyde to 4 parts by weight urea.

A further formulation of a urea borate which represents the compound known as Tybon 5411 is represented by the following:

*Example 1a*

5 parts by weight formaldehyde
4 parts by weight urea
2.5 percent by weight boric acid, based upon the total weight of formaldehyde and urea
10.0 percent by weight ethylene glycol, based upon the total weight of formaldehyde and urea In preparation, the materials are combined and heated up to reflux temperature for resinification.

Other polyhydric alcohols such as diethylene glycol, propylene glycol, glycerol and the like may be substituted for ethylene glycol. Other nitrogen based aldehyde resins, such as dicyandiamide formaldehyde, melamine formaldehyde, urea formaldehyde or guanidine formaldehyde may be substituted in whole or in part in the urea-borate. For purposes of description, it will be understood that the term "urea-borate," as used herein, may be intended to include such other compounds. It will be further understood that the ingredients of the urea-borate may be varied in amounts within reasonable limitations well known to the practicing resin chemist.

In formulating the binder composition, the borated urea formaldehyde condensation reaction product and the alkyd resin can be combined in the ratio of 10-90 parts by weight alkyd resin to 90-10 parts by weight of the borated urea formaldehyde. Best results are secured when the alkyd resinous component is present in amounts greater than the urea-borate and it is therefore preferred to make use of the materials in the ratio of 55-80 parts by weight alkyd resin to 45-20 parts by weight of the urea-borate. Free boric acid in amounts up to 5 percent by weight may be added to the combined components in the binder composition.

When an oleaginous lubricant is employed in the binder composition, such for example as emulsifiable oils of the type sulfonated oils, high flash lubricating oils or other lubricants of the type described in the Bone et al. Patents 2,107,284 and 2,083,132, the lubricant may be added to the binder composition in amounts up to about 5 percent by weight of the binder solids but it is preferred to make use of less than 2 percent by weight of such lubricating compound.

As used herein, the term "glass fibers" is intended to include glass fibers of the type produced by the attenuation of molten streams of glass by blasts of high pressure steam directed angularly downwardly onto the streams as they issue from a glass melting bushing, as described in the Slayter et al. Patent 2,206,058, or the Simison et al. Patent 2,189,840. Included also are the more recently developed superfine glass wool fibers which are formed by burner blast blown systems, such as described in the C. J. Stalego Patent No. 2,489,243. In addition to the glass wool and superfine fibers, glass fibers capable of use in the practice of this invention for the manufacture of insulation products may be prepared of continuous glass fibers cut or chopped to shorter lengths or continuous glass fibers and yarns of endless lengths which are deposited in swirl patterns and in which such continuous fibers are used alone but preferably in combination with wool fibers in the formation of mats and batts combined with binders in the manufacture of insulations.

The following will illustrate formulations of binder compositions representing the practice of this invention in the manufacture of high temperature glass fiber insulation products:

Example 2

65 percent by weight alkyd resin (Hercules A–49–85W)
35 percent by weight urea-borate (Tybon 5411)
3 percent by weight boric acid based on the total weight of resin solids used
0.3 percent by weight emulsified high flash lubricating oil based on the total solids of resinous binder

Example 3

65 percent by weight alkyd resin (formed by the condensation of pentaerythritol and maleic acid with 10–15 percent ethylene glycol)
35 percent by weight urea-borate (formed by the reaction of urea formaldehyde, boric acid and ethylene glycol)
0.3 percent by weight emulsified oil (Kendex 0836)

Example 4

70 percent by weight alkyd resin
30 percent by weight urea-boric acid-formaldehyde-ethylene glycol condensation product (Tybon 5411)

Example 5

55–80 percent by weight alkyd resin (pentaerythritol, maleic acid and ethylene glycol condensation reaction product)
45–20 percent by weight urea-borate condensation product
1 percent by weight emulsified lubricating oil It is possible to make use of an organic solvent for dilution of the materials in the foregoing examples in the preparation of the desired composition used in the treatment of glass fibers, but from the standpoint of economy and freedom from fire hazards and the like, it is preferred to make use of an aqueous system in which the materials of the foregoing examples are contained in concentrations ranging from 10–30 percent by weight in the treating composition and preferably within the range of 15–25 percent by weight. In general, the alkyd resinous component will be soluble in the aqueous medium and the urea-borate condensation reaction product appears to be at least sufficiently soluble to enhance the formation of a stable aqueous system in which the oleaginous lubricant is contained as a dispersed phase therein. The stability of the treating composition is further enhanced by the addition of a small amount of ammonium hydroxide, usually not in excess of 0.5 percent by weight of the treating composition. Instead of ammonium hydroxide, use may be made of other corresponding compounds capable of reacting as an amine.

The procedures for application and cure are similar to those employed in present processes in that the binder composition may be sprayed onto the glass fibers in the desired amounts as the fibers rain down from above through the forming hood for deposition in interfelted relation to form a mat or a batt on a laterally moving collecting belt or else the binder may be sprayed, dripped or flow-coated onto the felted glass fibers after they have been formed into a mat or else felted in the desired arrangement, such as a cylindrical section for molding into a pipe wrap. The amount of binder composition required for securing the glass fibers in the desired bonded or molded relation is also similar to that employed in present processes, depending of course upon the density of the insulaton product and the strength or porosity desired therein. For low density insulations having a specific gravity of less than 3 pounds per square foot, the amount of binder solids may range from ½–2½ percent by weight of the glass fibers. For higher density insulations and for molded products, the amount of binder may be increased to 10–15 percent by weight but it is preferred to make use of a concentration ranging from 5–8 percent by weight of binder solids based upon the weight of glass fibers.

When applied in the desired amounts, the curing cycle, such as for example in the manufacture of a pipe insulation having from 5–8 percent by weight binder, will be completed in about 2 minutes at 500° F. It will be understood that the cure time will vary somewhat with the amount of resin, the density of the molded product and the thickness of the product to be molded and that it will vary inversely with the temperature of cure. It is desirable, in order to effect the desired reaction between the materials, that the temperature for cure exceed 400° F. but that it be held below 650° F.

Insulation products may be manufactured with binder compositions of the type described without the release of noxious fumes and without the development of dangerous conditions. The molded or bonded insulation products can be processed and otherwise handled as any other conventional type of insulation material heretofore produced but, instead of being limited to use under conditions incapable of developing temperatures in excess of 400° F., the insulation products prepared in accordance with the practice of this invention can be exposed directly to sparks, flame or temperatures up to 700–800° F. without punking or excessive deterioration.

Another important concept of this invention resides in the ability further to increase the heat stability of the insulation product for use under temperature conditions up to about the fusion temperature of the glass composition of which the fibers are formed. This may be accomplished by an after-treatment of the porous bonded insulation with a composition of the type described and claimed in my copending application filed concurrently herewith, and entitled "High Temperature Glass Fiber Insulation Products and Method for Manufacturing Same."

In accordance with the aforementioned copending application, the porous bonded insulation base is treated with a composition to introduce silicic acid alone, in the event that it is desired further to raise the resistance to punking up to a temperature of 800° F., or to introduce a reaction product of silicic acid and urea borate, alone or in combination with a finely divided siliceous filler, for purposes of introducing a bonded insulation capable of use up to temperatures in the range of 1200° F. without deterioration.

Briefly described, the materials may be combined in the ratio of 1 part by weight silicic acid to 0.2–1.0 parts by weight of urea-borate and 1–4 parts by weight of siliceous filler, when present. The materials are applied from aqueous medium in which the silicate or other siliceous fillers are dispersed to introduce from 15–35 percent by weight of the material in the porous, bonded or molded glass fiber insulation product. Introduction, as by impregnation, for substantially uniform distribution of the materials may be achieved by a flow-coat process or other saturation process followed by suitable drainage to remove excess of the treating composition.

Baking to eliminate the diluent and to react the silicic acid with urea-borate in the formation of a new type of organic-inorganic binder may be carried out at a temperature ranging from 400–700° F. for a time depending upon the ability to eliminate the diluent with additional time for reaction of the materials. For example, a molded pipe insulation treated to introduce about 20–30 percent by weight of the solids of the after-treating composition may be baked for 1 hour at 600° F. to effect the desired drying and reaction.

As a siliceous filler, it is preferred to make use of aluminum silicate but other silicates or siliceous material such as silica, clay, bentonite, and the like, in finely divided form, may be used. The organic borate is substantially similar to the urea-borate condensation product employed in the manufacture of the original binder composition. The fillers may be other than siliceous materials. Other suitable finely divided inorganic materials include various carbonates, oxides, sulfates and the like.

The following will illustrate formulations of after-treating compositions which may be used in the practice of this invention:

*Example 6*

0.4 part by weight organic borate (Tybon 1016B—condensation product of urea, boric acid, glycol and formaldehyde)
1.0 part by weight silicic acid
Water in amounts to produce a mixture having 20 percent solids

*Example 7*

41 parts by weight silicic acid
18 parts by weight urea borate (condensation product of urea, boric acid and glycol)
41 parts by weight Canary clay
Water in amounts to produce a mixture having 25 percent solids

*Example 8*

1½–4 parts by weight filler
1 part by weight silicic acid
0.2–1.0 part by weight organic borate (urea, boric acid, glycol and formaldehyde)

*Example 9*

1½–2 parts by weight siliceous filler
1 part by weight silicic acid
0.2–0.5 parts by weight organic borate (Tybon 1016B)
Water in amounts to provide a composition having 20–35 percent by weight solids It will be understood that other inorganic fibers such as mineral wool fibers and asbestos fibers may be used with such binders in the manufacture of high temperature insulation products and that other changes may be made in the details of the formulations, methods of their application and treatment to form high temperature glass fiber insulation products without departing from the spirit of the invention, especially as defined in the following claims.

I claim:

1. A high temperature insulation product comprising glass fibers arranged as a porous base and a binder securing the fibers one to another into a bonded insulation in which the binder comprises the combination of an alkyd resin and a urea-borate condensation reaction product present in the ratio of 10–90 parts by weight of the alkyd resin to 90–10 parts by weight of the urea-borate.

2. A high temperature insulation product comprising glass fibers arranged as a porous base and a binder securing the fibers one to another in which the binder comprises the combination of an alkyd resin and a urea-borate condensation reaction product present in the ratio of 55–80 parts by weight of the alkyd resin to 45–20 parts by weight of the urea-borate and in which the binder is present in amounts ranging from ½–15 percent by weight of the glass fibers.

3. A high temperature insulation product comprising a porous base of glass fibers and a binder securing the fibers one to another in which the binder comprises the combination of an alkyd resin, a urea-borate condensation reaction product and boric acid in which the boric acid is present in amounts ranging up to 5 percent by weight of the binder and in which the other materials are present in the ratio of 55–80 parts by weight of alkyd resin to 45–20 parts by weight of the urea-borate.

4. A high temperature insulation product as claimed in claim 2 in which the binder contains up to 5 percent by weight of an incompatible lubricant.

5. A high temperature insulation product comprising a porous base of glass fibers, a binder securing the fibers one another to form a bonded insulation in which the binder comprises the combination of an alkyd resin and a urea-borate condensation reaction product present in the ratio of 10–90 parts by weight of the alkyd resin to 90–10 parts by weight of the urea-borate, and a material contained in the bonded glass fiber insulation consisting of silicic acid in amounts ranging from 15–35 percent by weight.

6. A high temperature insulation product comprising a porous base of glass fibers, a binder present in amounts ranging from ½–15 percent by weight of the glass fibers for securing the fibers one to another into a bonded insulation, and in which the binder comprises the combination of an alkyd resin and a urea-borate condensation reaction product present in the ratio of 10–90 parts by weight of the alkyd resin to 90–10 parts by weight of urea-borate, and a material contained in uniform distribution throughout the porous bonded glass fiber insulation comprising the thermal reaction product of silicic acid and urea-borate.

7. A high temperature insulation product comprising a porous base of glass fibers, a binder present in amounts ranging from ½–15 percent by weight of the glass fibers for securing the fibers one to another into a bonded insulation, and in which the binder comprises the combination of an alkyd resin and a urea-borate condensation reaction product present in the ratio of 10–90 parts by weight of the alkyd resin to 90–10 parts by weight of urea-borate, and a material contained in uniform distribution throughout the porous bonded glass fiber insulation comprising the thermal reaction product of silicic acid and urea-borate in which the silicic acid and urea-borate are present in the ratio of 1 part by weight silicic acid to 0.2–1.0 part by weight urea-borate and in which the reaction product is present in amounts ranging from 15–35 percent by weight of the insulation product.

8. A high temperature insulation product comprising a porous base of glass fibers, a binder present in amounts ranging from ½–15 percent by weight of the glass fibers for securing the fibers one to another into a bonded insulation, and in which the binder comprises the combination of an alkyd resin and a urea-borate condensation reaction product present in the ratio of 10–90 parts by weight of the alkyd resin to 90–10 parts by weight of urea-borate, and a material contained in uniform distribution throughout the bonded insulation comprising the reaction product of silicic acid, urea-borate and a siliceous filler.

9. A high temperature insulation product comprising a porous base of glass fibers, a binder present in amounts ranging from ½–15 percent by weight of the glass fibers for securing the fibers one to another into a bonded insulation, and in which the binder comprises the combination of an alkyd resin and a urea-borate condensation reaction product present in the ratio of 10–90 parts by weight of the alkyd resin to 90–10 parts by weight of urea-borate, and a material contained in uniform distribution throughout the bonded insulation comprising the reaction product of silicic acid, urea-borate and a siliceous filler in which the materials are present in the ratio of 1 part by weight silicic acid to 1–4 parts by weight of siliceous filler to 0.2–1.0 part by weight of urea-borate and in which the reaction product is present in amounts ranging from 15–35 percent by weight of the insulation product.

10. In the method of manufacturing a bonded high temperature insulation product, the steps of arranging glass fibers into an interfelted mass, applying a binder composition to the interfelted glass fibers containing the combination of an alkyd resin and a urea-borate condensation reaction product present in the ratio of 10–90 parts by weight of alkyd resin to 90–10 parts by weight of the urea-borate, and baking the treated fibers to set the binder for securing the fibers one to another.

11. In the method of manufacturing a bonded high temperature insulation product, the steps of forming a porous mass of glass fibers, treating the glass fibers with a binder composition containing the combination of an alkyd resin and a urea-borate present in the ratio of 55–80 parts by weight of the alkyd resin to 45–20 parts by weight of the urea-borate, and heating the binder to a temperature within the range of 400–650° F. to set the binder for securing the fibers one to another.

12. In the method of manufacturing a bonded high temperature insulation product, the steps of arranging glass fibers into a porous interfelted mass, treating the glass fibers with a binder composition having a solids content of 10–30 percent by weight which contains the combination of an alkyd resin and a urea-borate present in the ratio of 55–80 parts by weight of the alkyd resin to 45–20 parts by weight of the urea-borate and which is applied in amounts to deposit ½–15 percent by weight of the binder solids based upon the weight of the glass fibers.

13. The method as claimed in claim 12 in which the binder composition contains up to 5 percent by weight of boric acid.

14. The method as claimed in claim 12 in which the binder composition contains up to 5 percent by weight of an incompatible oleaginous lubricant.

15. The method of manufacturing a high temperature insulation product comprising impregnating the bonded insulation product by the method of claim 10 with a solution of silicic acid to deposit 15–35 percent by weight silicic acid based upon the weight of the insulation product substantially uniformly throughout the bonded insulation.

16. In the method of manufacturing a high temperature insulation product, the step of impregnating the bonded insulation prepared by the method of claim 10 with a composition containing the reaction product of silicic acid and urea-borate present in the ratio of 1 part by weight silicic acid to 0.2–1.0 part by weight of urea-borate and in which the reaction product is substantially uniformly distributed throughout the bonded insulation in amounts ranging from 15–35 percent by weight of the insulation product.

17. In the method of manufacturing a high temperature insulation, the step of impregnating the bonded insulation prepared by the method of claim 10 with a composition containing the reaction product of silicic acid, urea-borate and siliceous filler present in the ratio of 1 part by weight of silicic acid, 0.2–1.0 part by weight urea-borate and 1–4 parts by weight of siliceous filler and in which the materials are present in amounts ranging from 15–35 percent by weight of the insulation product.

18. In the method of manufacturing a bonded high temperature insulation, the steps of impregnating the bonded insulation prepared by the method of claim 12 with a composition containing silicic acid and urea-borate in the ratio of 1 part by weight silicic acid to 0.2–1.0 part by weight urea-borate and in which the materials are deposited in amounts ranging from 15–35 percent by weight of the insulation product, and heating the impregnated bonded insulation to a temperature within the range of 400–700° F. for reaction of the silicic acid with the urea-borate.

19. In the method of manufacturing a bonded high temperature insulation, the steps of impregnating the bonded insulation prepared by the method of claim 12 with a composition containing silicic acid, urea-borate and siliceous filler in the ratio of 1 part by weight silicic acid, 0.2–1.0 part by weight urea-borate and 1–4 parts by weight siliceous filler and in which the materials are deposited in amounts ranging from 15–35 percent by weight of the insulation product, and heating the impregnated bonded insulation to a temperature within the range of 400–700° F. for reaction of the materials.

References Cited in the file of this patent

UNITED STATES PATENTS

| | | |
|---|---|---|
| 1,920,451 | Knilling | Aug. 1, 1933 |
| 2,076,078 | French | Apr. 6, 1937 |
| 2,252,157 | Bergin et al. | Aug. 21, 1941 |
| 2,298,295 | Hyatt | Oct. 13, 1942 |
| 2,428,752 | Hewett | Oct. 7, 1947 |
| 2,454,187 | Leape et al. | Nov. 16, 1948 |
| 2,491,409 | Kropa et al. | Dec. 13, 1949 |
| 2,501,783 | Morgan | Mar. 28, 1950 |
| 2,593,817 | Waggoner | Apr. 22, 1952 |
| 2,703,486 | Ford | Mar. 8, 1955 |

FOREIGN PATENTS

| | | |
|---|---|---|
| 2,076,078 | France | Apr. 6, 1937 |